(12) United States Patent
Johnson

(10) Patent No.: US 11,728,579 B2
(45) Date of Patent: Aug. 15, 2023

(54) GROUNDING PLATE AND METHODS OF SHIPPING AND INSTALLING A GROUNDING PLATE

(71) Applicant: Robert Johnson, Sherwood Park (CA)

(72) Inventor: Robert Johnson, Sherwood Park (CA)

( * ) Notice: Subject to any disclaimer, the term of this patent is extended or adjusted under 35 U.S.C. 154(b) by 508 days.

(21) Appl. No.: 16/837,915

(22) Filed: Apr. 1, 2020

(65) Prior Publication Data

US 2020/0321714 A1 Oct. 8, 2020

(30) Foreign Application Priority Data

Apr. 3, 2019 (CA) .................................. CA 3038935

(51) Int. Cl.
*H01R 4/16* (2006.01)
*H01R 43/16* (2006.01)
*H01R 4/66* (2006.01)

(52) U.S. Cl.
CPC .................. *H01R 4/16* (2013.01); *H01R 4/66* (2013.01); *H01R 43/16* (2013.01)

(58) Field of Classification Search
CPC . H01R 4/16; H01R 4/66; H01R 43/16; H02G 13/40
See application file for complete search history.

(56) References Cited

U.S. PATENT DOCUMENTS

| | | | |
|---|---|---|---|
| 4,577,053 A | 3/1986 | Kies | |
| 4,621,476 A | 11/1986 | MacGregor | |
| 6,551,129 B2 | 4/2003 | Kato | |
| 7,652,865 B2 | 1/2010 | Woo et al. | |
| 2006/0126259 A1 | 6/2006 | Stockin et al. | |
| 2008/0308288 A1 | 12/2008 | Crutcher | |

FOREIGN PATENT DOCUMENTS

| | | |
|---|---|---|
| CN | 102570069 | 5/2014 |
| JP | H073578 Y2 * | 1/1995 |
| JP | 2002117918 | 4/2002 |

(Continued)

OTHER PUBLICATIONS

IronMan Metals, Grounding Plate, Product Description, Apr. 17, 2018.

(Continued)

*Primary Examiner* — Travis S Chambers
(74) *Attorney, Agent, or Firm* — Finch & Maloney PLLC

(57) ABSTRACT

A method of transporting grounding plates is provided, having a step of providing a plurality of grounding plates made from an electrically conductive material. Each grounding plate has a plate body with first and second faces that are planar, opposed, and parallel to each other, and a grounding connector formed from the same material and having a first end connected to the plate body. The grounding connector is bendable about the first end from a planar configuration to a functional configuration. In the planar configuration, the grounding connector is aligned with and parallel to the first and second faces of the plate body, and in the functional configuration, the grounding connector is at an angle relative to the first face of the plate body. The method has the further steps of stacking the plurality of grounding plates in the planar configuration and transporting the stack to a destination.

15 Claims, 8 Drawing Sheets

(56) References Cited

FOREIGN PATENT DOCUMENTS

| | | |
|---|---|---|
| JP | 2006190688 | 7/2006 |
| KR | 100809011 B1 * | 3/2008 |
| KR | 100907699 | 7/2009 |
| KR | 101089834 B1 * | 12/2011 |
| KR | 101255118 | 4/2013 |
| KR | 101262359 | 5/2013 |
| KR | 20150089906 | 2/2016 |
| KR | 20160016331 | 2/2016 |
| WO | 2017018949 | 2/2017 |

OTHER PUBLICATIONS

Shepherd Anchor Systems, Solid Ground Plate Info, at least Apr. 19, 2018.
Thomas & Betts, Ground Plates Info, at least Apr. 24, 2018.
Schletter Grounding Plate, 135004-001, at least May 10, 2018.
Ground Plates—WAPP, at least May 10, 2018.
ERITECH Grounding and Bonding Catalogue, at least Dec. 7, 2011.
NVent ERICO Copper Ground Plate, at least May 10, 2018.

* cited by examiner

GROUNDING PLATE AND METHODS OF SHIPPING AND INSTALLING A GROUNDING PLATE

TECHNICAL FIELD

This relates to a method of installing a grounding plate, a method of shipping a grounding plate, and a grounding plate, such as a grounding plate with a bendable connector.

BACKGROUND

Grounding plates are used in building construction to provide a grounding connection for electrical systems within the building. One example of a grounding plate for use in building construction is found in U.S. Pat. No. 4,621,476 entitled GROUNDING ELECTRODE.

SUMMARY

According to an aspect, there is provided a method of transporting grounding plates, comprising providing a plurality of grounding plates that are made from an electrically conductive material, each grounding plate comprising a plate body, the plate body having a first face and a second face opposite and parallel to the first face, the first and second faces being planar, a grounding connector formed from the same material as the plate body, having a first end and a second end, the first end being connected to the plate body, wherein the grounding connector is bendable relative to the plate body about the first end of the grounding connector from a planar configuration to a functional configuration, wherein, in the planar configuration, the grounding connector is aligned with and parallel to the first and second faces of the plate body, and in the functional configuration, the grounding connector is at an angle relative to the first face of the plate body, and stacking the plurality of grounding plates in the planar configuration, and transporting the stacked plurality of grounding plates to a destination.

According to other aspects, in the planar configuration, the grounding plate may form a rectangle and the grounding connector may extend along a long edge of the rectangle, the grounding connector may have a wire connection point toward the second end of the grounding connector for connecting to a grounding wire of a structure, providing the grounding plate may comprise cutting the grounding plate from a peripheral edge to an intermediate point within the peripheral edge to form the plate body and the grounding connector.

According to an aspect, there is provided a method of electrically grounding a structure, comprising providing a grounding plate that is made from an electrically conductive material, the grounding plate comprising a plate body, the plate body having a first face and a second face opposite and parallel to the first face, the first and second faces being planar, a grounding connector formed from the same material as the plate body, having a first end and a second end, the first end being connected to the plate body, bending the grounding connector relative to the plate body about the first end of the grounding connector from a planar configuration to a functional configuration, wherein, in the planar configuration, the grounding connector is aligned with and parallel to the first and second faces of the plate body, and in the functional configuration, the grounding connector is at an angle relative to the first face of the plate body, installing the grounding plate in a ground surface such that the plate body is embedded below the ground surface and the second end of the grounding connector extends above the ground surface.

According to other aspects, the method may further comprise the step of removing the grounding plate from a stack of a plurality of grounding plates in the planar configuration, installing the grounding plate in the ground surface may comprise pouring a layer of concrete above the plate body and below the second end of the grounding connector, in the planar configuration, the grounding plate may form a rectangle and the grounding connector may extend along a long edge of the rectangle, the grounding connector may have a wire connection point toward the second end of the grounding connector for connecting to a grounding wire of a structure and wherein installing the grounding plate may comprise connecting a wire between the structure and the wire connection, and providing the grounding plate may comprise cutting the grounding plate from a peripheral edge to an intermediate point within the peripheral edge to form the plate body and the grounding connector.

According to an aspect, there is provided a stack of grounding plates, comprising a plurality of grounding plates in a stacked relationship, each grounding plate comprising a plate body, the plate body having a first face and a second face opposite and parallel to the first face, the first and second faces being planar, a grounding connector formed from the same material as the plate body, having a first end and a second end, the first end being connected to the plate body, wherein the grounding connector is bendable relative to the plate body about the first end of the grounding connector from a planar configuration to a functional configuration, wherein, in the planar configuration, the grounding connector is aligned with and parallel to the first and second faces of the plate body, and in the functional configuration, the grounding connector is at an angle relative to the first face of the plate body.

According to other aspects, in the planar configuration, each grounding plate may form a rectangle and the grounding connector may extend along a long edge of the rectangle, the grounding connector may have a wire connection point toward the second end of the grounding connector for connecting to a grounding wire of a structure, and the grounding plate may be formed by cutting the grounding plate from a peripheral edge to an intermediate point within the peripheral edge to form the plate body and the grounding connector.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Figure 1:
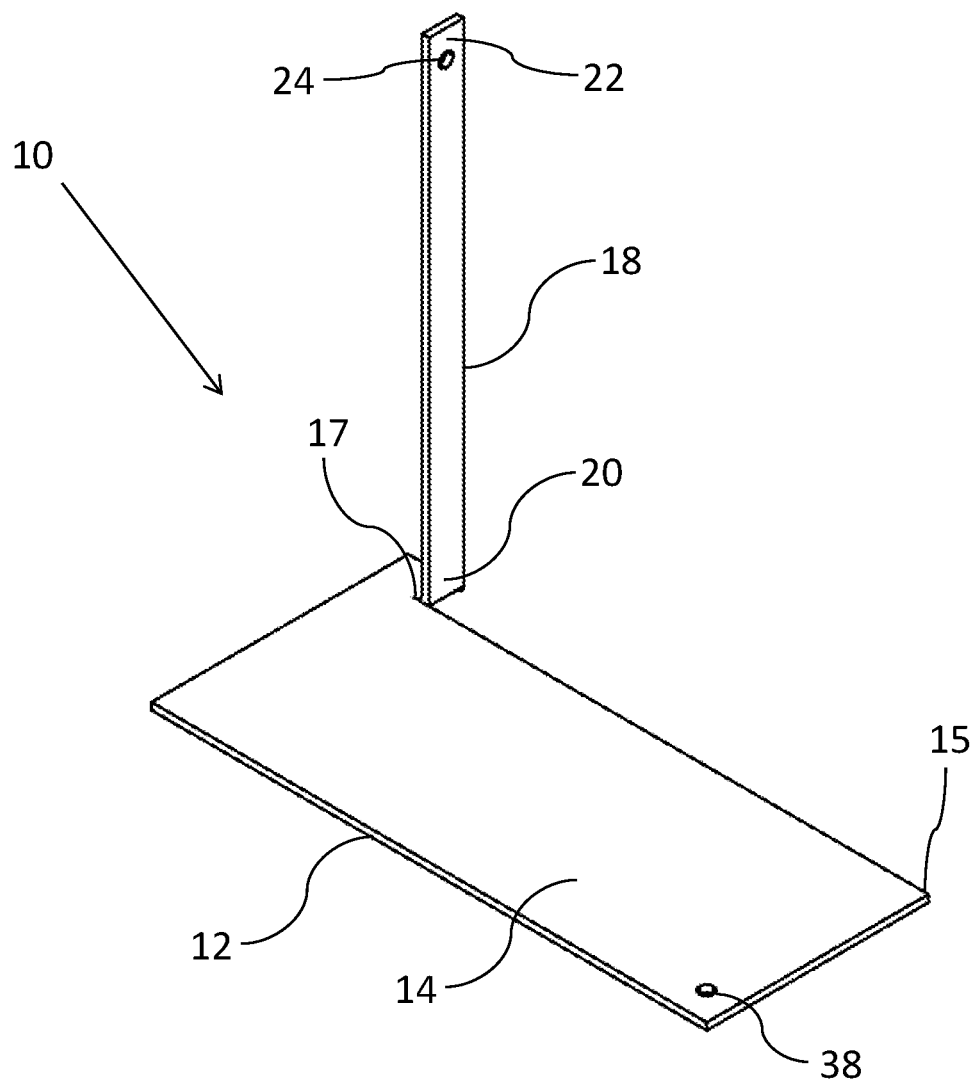
FIG. 1 is a perspective view of a grounding plate with a grounding component extending from the plate.
Figure 2:
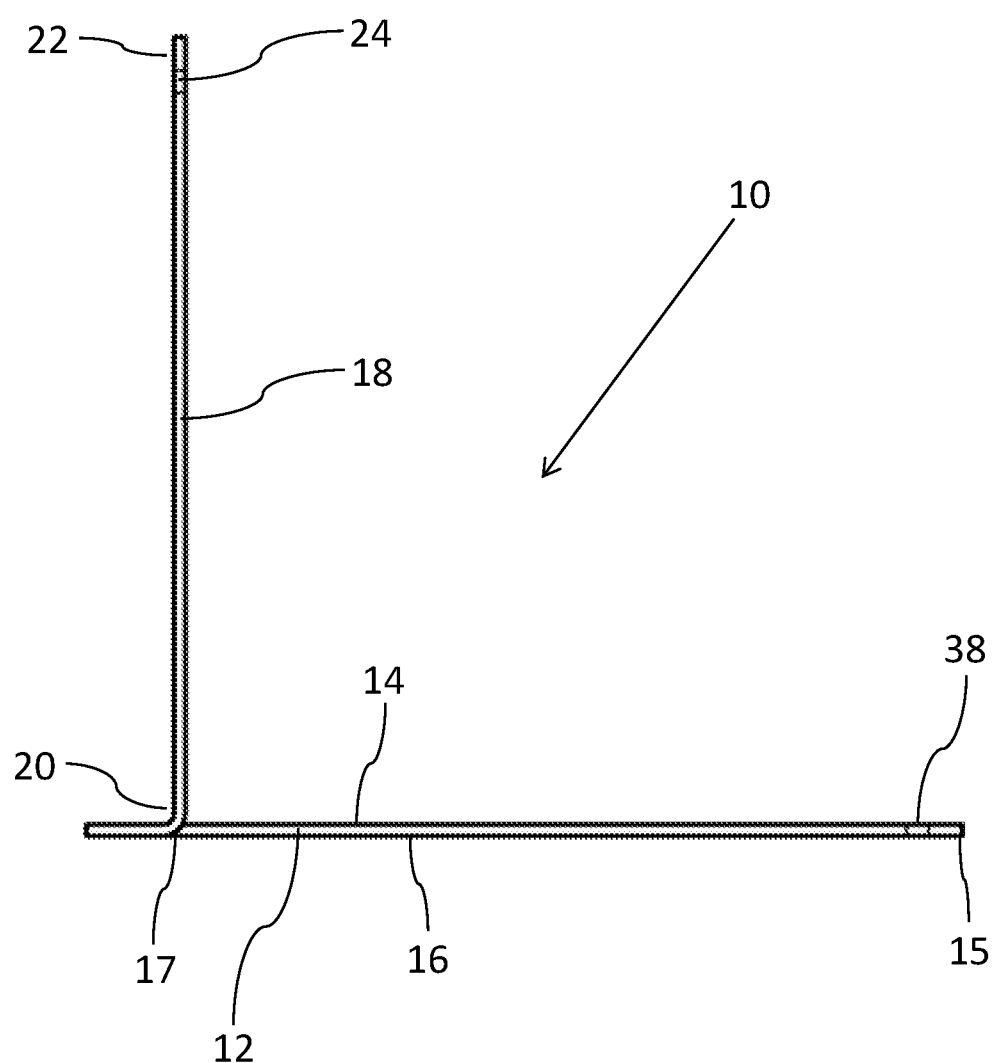
FIG. 2 is a side elevation view of the grounding plate of FIG. 1.
Figure 3:
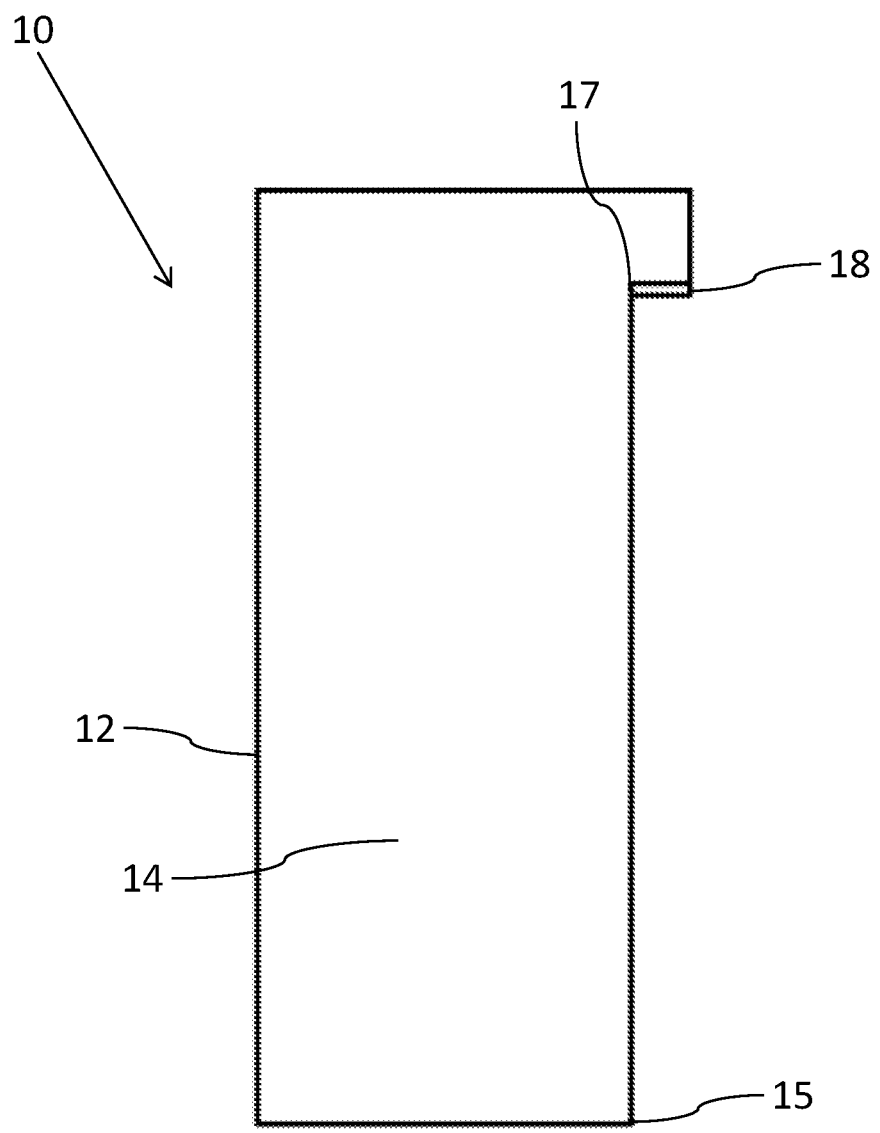
FIG. 3 is a top plan view of the grounding plate of FIG. 1.

A grounding plate, generally identified by reference numeral 10, will now be described with reference to FIG. 1 through 7.

Referring to FIG. 1, grounding plate 10 is shown. Grounding plate 10 is made from an electrically conductive material, as will be understood by those of skill in the art. As shown grounding plate 10 is generally rectangular. However, it will be understood that the shape of grounding plate 10 is generally governed by practical concerns such as ease of manufacturing, shipping, and handling, and that it may take a variety of shapes, such as shapes with angled sides, rounded sides, etc. It will also be understood that the dimensions of grounding plate 10 may be varied depending on the requirements of the application, such as the bury depth of the plate. For example, the plate may be made longer in order to provide a longer grounding connector when the plate is to be buried deeper.

Grounding plate 10 has a plate body 12 with a first face 14 and a second face 16 that is opposite and parallel to first face 14. First and second faces 14 and 16 are planar. A grounding connector 18 is formed from the same material as plate body 12 and has a first end 20 and a second end 22, with first end 20 being connected to plate body 12. Grounding connector 18 may be formed by cutting grounding plate 10 from a peripheral edge 15 to an intermediate point 17 within the peripheral edge to form plate body 12 and grounding connector 18. This may be done, for example, by machining a cut into a sheet of electrically conductive material. Other techniques for cutting grounding plate 10 may be used, as will be understood by those skilled in the art. Grounding connector 18 may be formed from a sheet of material by the same processes that are used to form plate body 12 in the manufacturing process.

Figure 4:
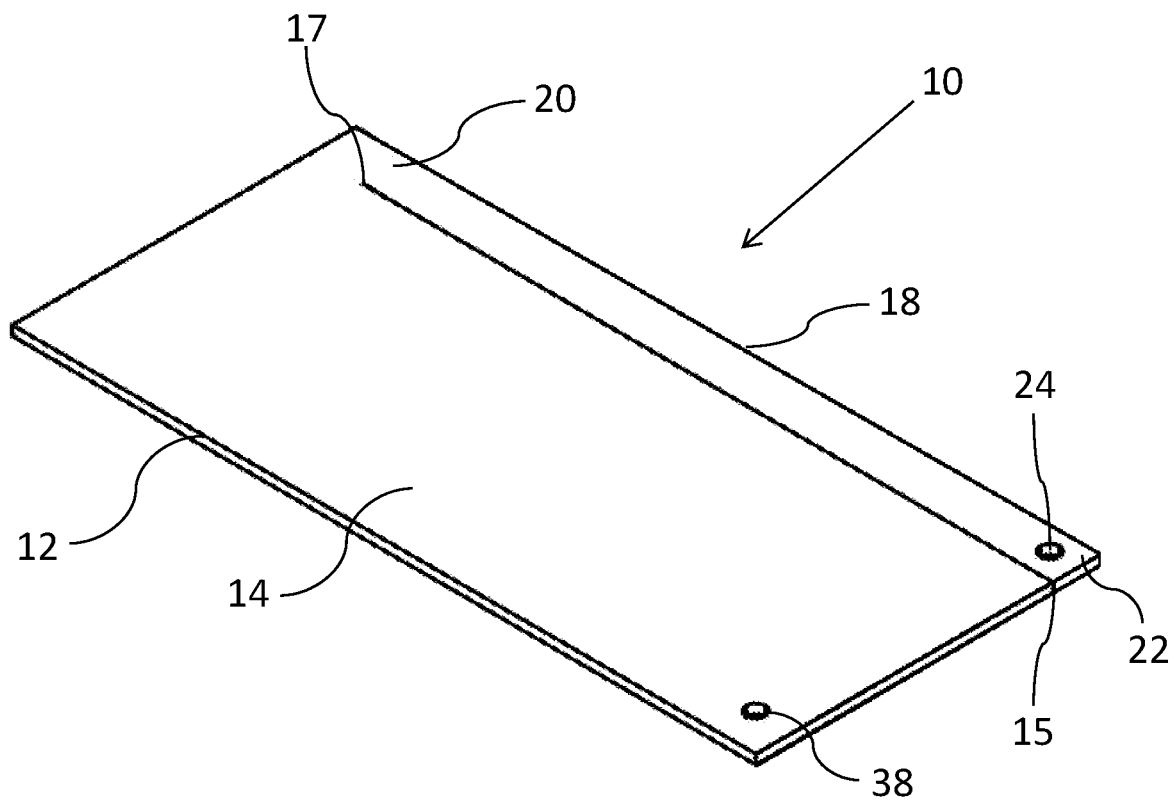
FIG. 4 is a perspective view of a grounding plate with the grounding component in the plane of the plate.
Figure 7:
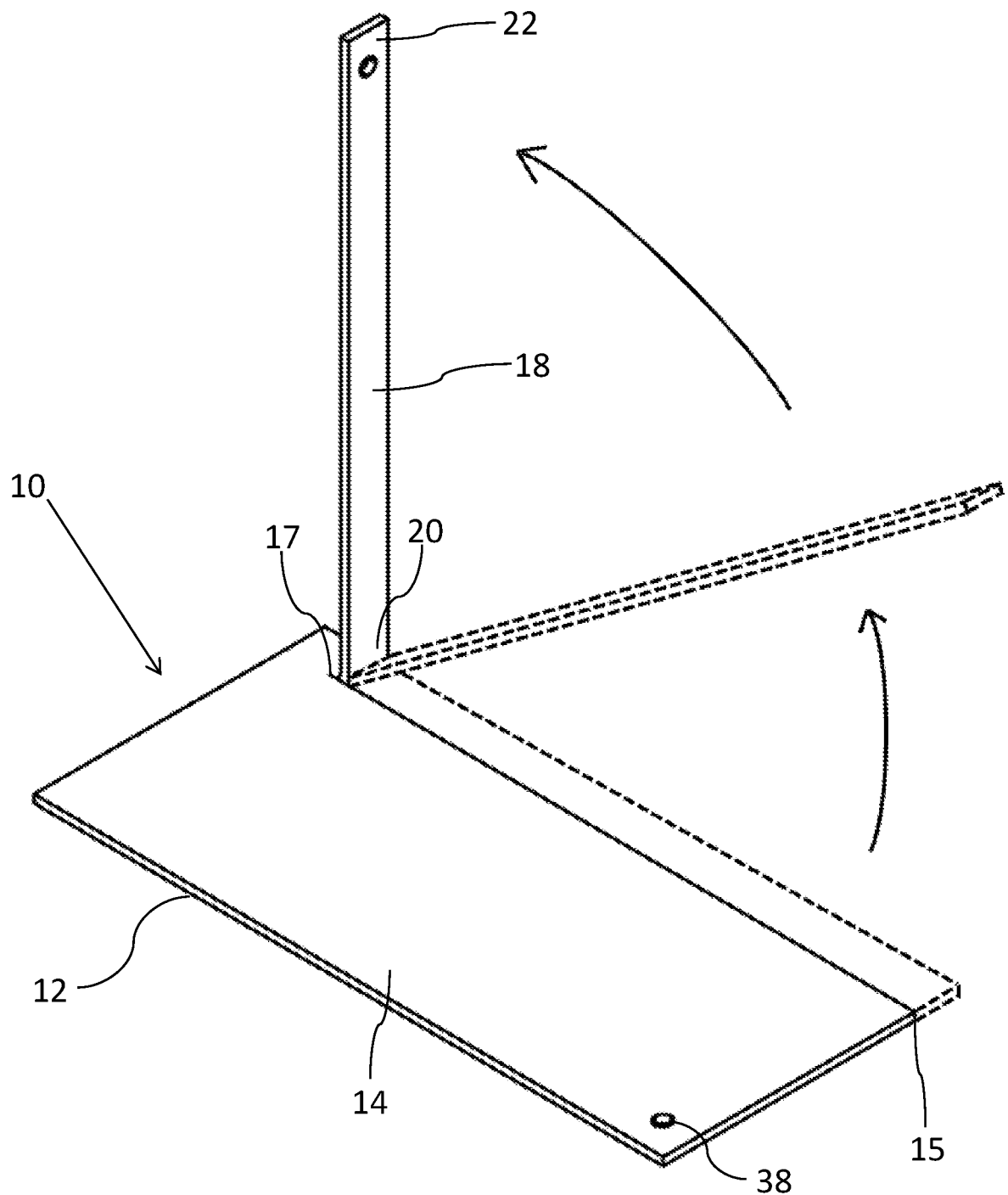
FIG. 7 is a perspective view of a grounding plate showing the bending process for the grounding plate.
Figure 8:
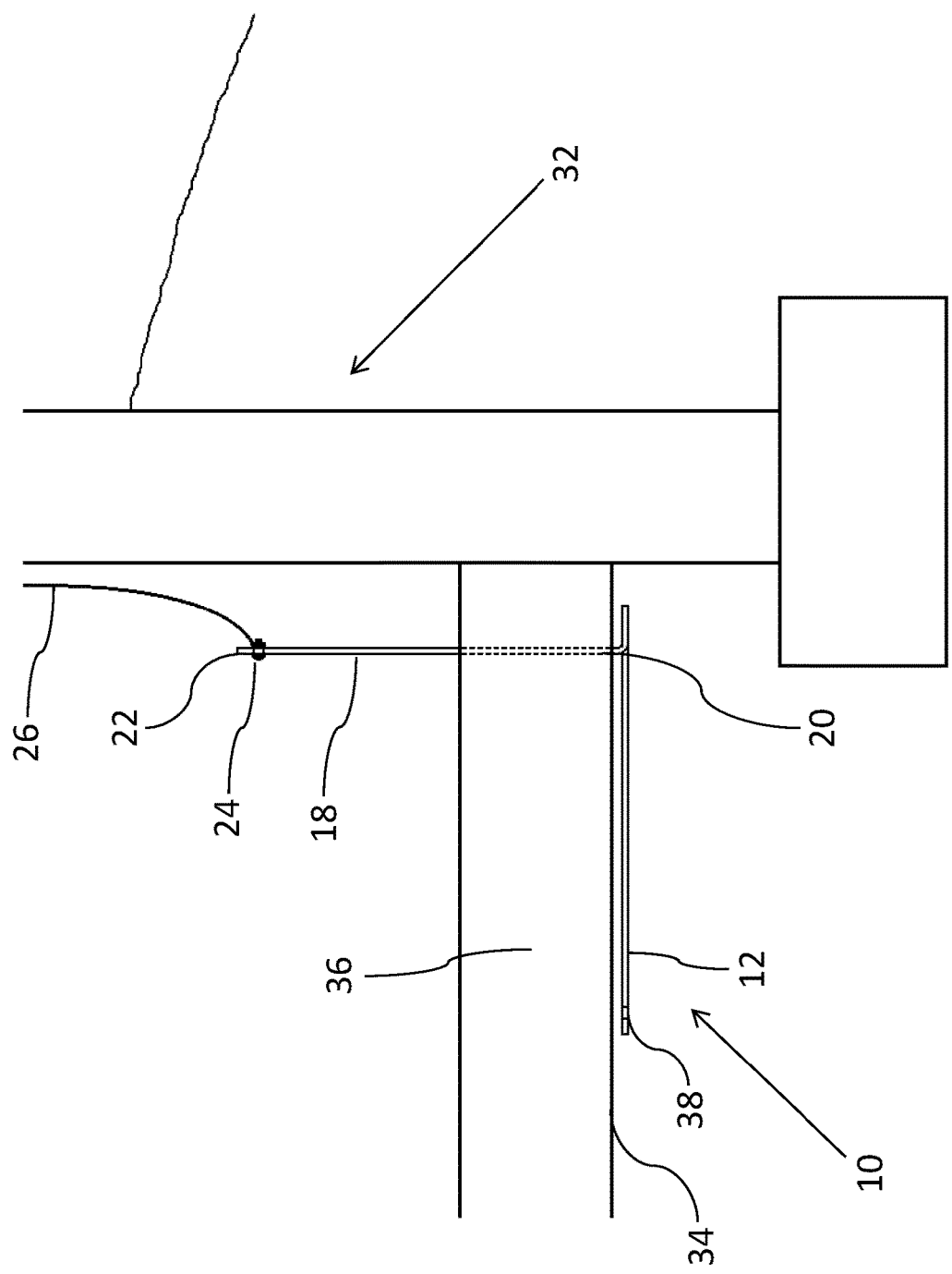
FIG. 8 is a side elevation view showing a grounding plate installed in a building.

Referring to FIG. 7, grounding connector 18 is bendable relative to plate body 12 about first end 20 of grounding connector 18 from a planar configuration as shown in FIG. 4 to a functional configuration as shown in FIG. 1. In the planar configuration shown in FIG. 4, grounding connector 18 is aligned with and parallel to first and second faces 14 and 16 of plate body 12. In the functional configuration, grounding connector 18 is at an angle relative to first face 14 of plate body 12. As shown in the drawings, grounding connector 18 may be bent such that it is perpendicular to plate body 12, or it may be placed at a different angle depending on the application. Referring to FIG. 4, when grounding plate 10 is rectangular, grounding connector 18 may extend along a long edge of the rectangle. Referring to FIG. 1, grounding connector 18 may be provided with a wire connection point 24 towards second end 22 of grounding connector 18 for connecting to a grounding wire 26 of a structure 28, as shown in FIG. 8. It will be understood that one or more connections may be formed to grounding connector 18 at the time of installation. Grounding connector 18 may also be positioned to allow for future connections to be made. In addition, while FIG. 8 depicts grounding connector 18 extending above the ground surface 34, it will be understood that grounding plate 10 may also be entirely buried, with the connection to grounding connector 18 being formed below ground. Plate body 12 may also be provided with a second wire connection point 38 for connecting a wire (not shown) between grounding plates. Underground wire connections may be formed between multiple grounding plates 10 to create a grid of underground grounding plates 10 that are in electrical communication. This may, for example, be used in complexes having multiple building units. However, it will be understood that a single grounding plate 10 may be used in isolation, and may not be provided with second wire connection point 38. Connections between grounding plates 10 may be formed both above and below ground, or a combination thereof, to provide an interconnected system with multiple grounding plates 10 as required by the particular application.

Figure 5:
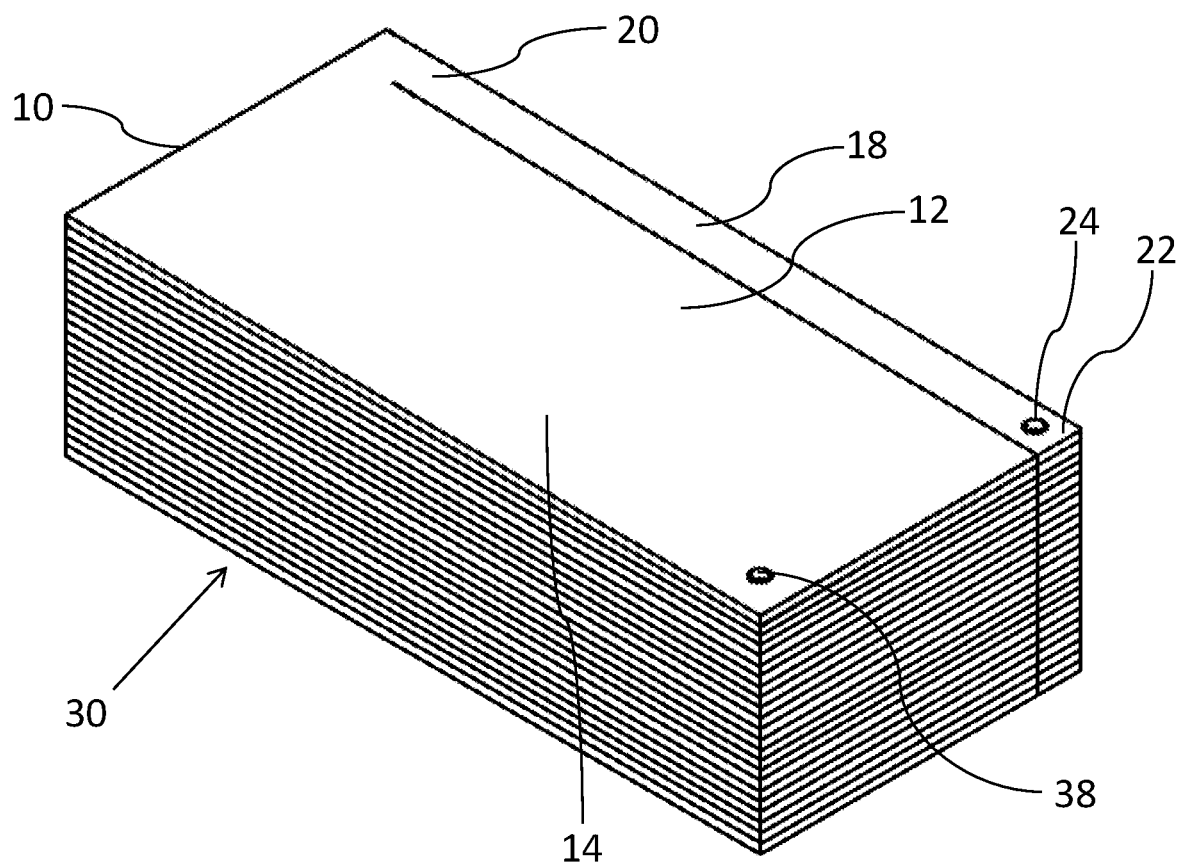
FIG. 5 is a perspective view of a stack of grounding plates with the grounding component in the plane of the plate.
Figure 6:
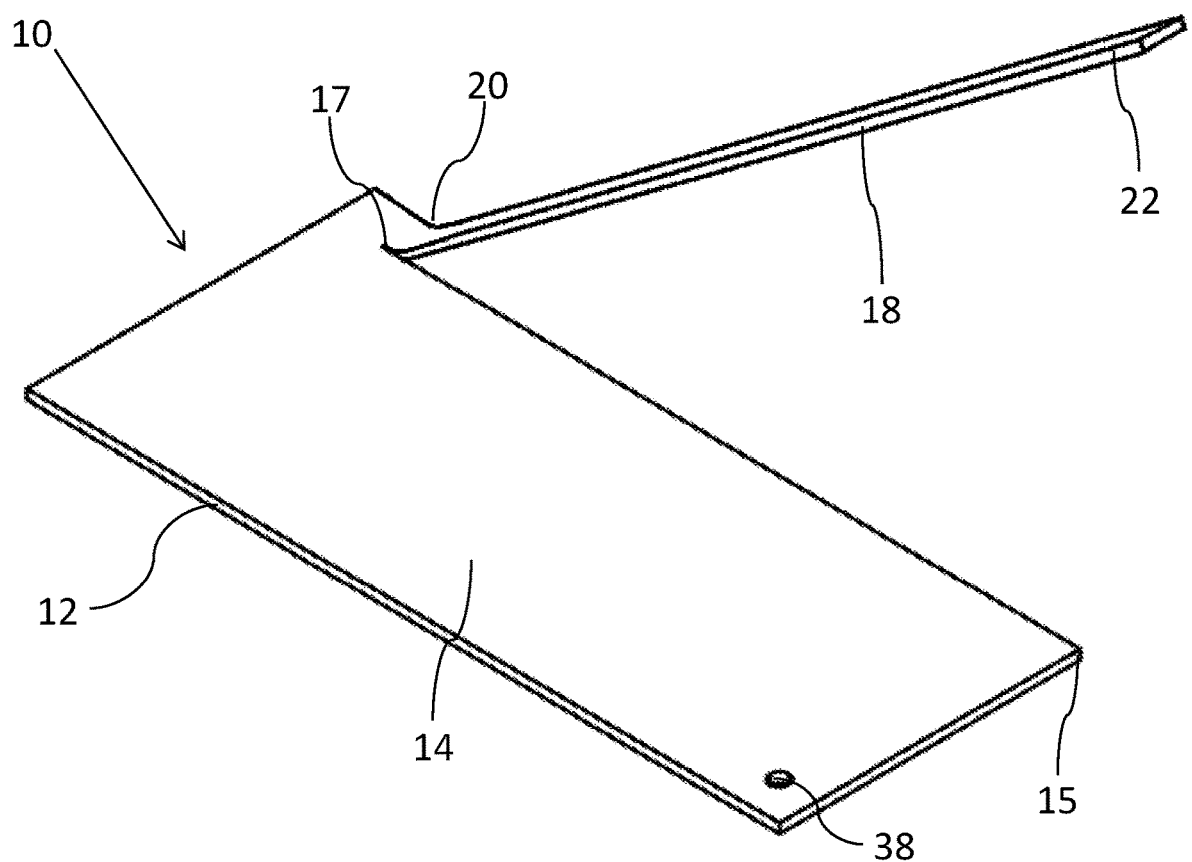
FIG. 6 is a perspective view of a grounding plate with the grounding component in the process of being bent.

Referring to FIG. 5, a stack of grounding plates 30 is shown, which is made up of a plurality of ground plates 10 in a stacked relationship, with grounding plates 10 in the planar configuration. In this configuration, a large number of grounding plates can be conveniently transported to a destination, as such a stack of plate in the planar configuration can be handled, secured, shipped, or stored with relative ease. It will be understood that stacking grounding plates 10 in a stack 30 as shown increases the number of grounding plates 10 that may be provided in a given volume, and decrease the risk of damage to grounding plates 10 as well as the packaging required for grounding plates 10 during transport, relative to the functional configuration shown in FIG. 1.

Referring to FIG. 8, grounding plate 10 is depicted as being used to electrically ground a structure 32. Grounding plate 10 is designed such that it may be transported to the site of structure 32 in the planar configuration, and upon arriving on site or at another convenient location, grounding connector 18 is bent relative to plate body 12 about first end 20 until it is at a desired angle relative to plate body 12, as shown in FIG. 8. Grounding plate 10 may therefore be shipped in a compact configuration. In most cases, this angle will be roughly 90 degrees, although any convenient angle may be used that permits an electrical connection to be made with grounding connector 18 while properly installing grounding plate 10. Grounding plate 10 is preferably made from a material that may be manually manipulated by a worker on site without the need for specialized tools. This may also depend on the thickness and width of ground connector 18 at the point at which it connects to the plate body 12. In one example, ground connector 18 may be bent by having a worker stand on plate body 12 while lifting on ground connector 18, or by otherwise clamping plate body 12 in place while lifting up or pressing down on ground connector 18. If present and if required, a tool may be inserted through the aperture of wire connection point 24 to obtain additional leverage on grounding connector 18 relative to plate body 12. However, ground connector 18 can be configured to the desired shape relatively easily without requiring the use of tools.

Once grounding connector 18 is bent such that grounding plate 10 is in the functional configuration, grounding plate 10 is installed in a ground surface 34 by embedding plate body 12 below ground surface 34 with second end 22 of grounding connector 18 extending above ground surface 34. It will be understood that grounding connector 18 may be bent prior to installation of grounding plate 10 in a ground surface 34, or grounding plate 10 may be placed in an excavation and then grounding connector 18 may be bent prior to burial of plate body 12. Depending on the type of building and the requirements of the application, installing grounding plate 10 in ground surface 34 may involve pouring a layer of concrete 36 above plate body 12 and below second end 22 of grounding connector 18. Referring to FIG. 8, wire connection point 24 is toward second end 22 of grounding connector 18 such that a grounding wire 26 can be connected from structure 32. Installation of ground plate 10 may be completed by connecting grounding wire 26 between structure 32 and wire connection 24. As discussed above, connections may also be formed below ground surface 34, and connections between grounding plates may be formed with second wire connection point 38.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of transporting grounding plates, comprising: providing a plurality of grounding plates that are made from an electrically conductive material, each grounding plate comprising: a plate body, the plate body having a first face and a second face opposite and parallel to the first face, the first and second faces being planar; a grounding connector formed from the same material as the plate body, having a first end and a second end, the first end being connected to the plate body; wherein the grounding connector is bendable relative to the plate body about the first end of the grounding connector from a planar configuration to a functional configuration, wherein, in the planar configuration, the grounding connector is aligned with and parallel to the first and second faces of the plate body, and in the functional configuration, the grounding connector is at an angle relative to the first face of the plate body; and stacking the plurality of grounding plates in the planar configuration; and transporting the stacked plurality of grounding plates to a destination; wherein providing the grounding plate comprises cutting the grounding plate from a peripheral edge to an intermediate point within the peripheral edge to form the plate body and the grounding connector.

2. The method of claim 1, wherein the grounding connector has a wire connection point toward the second end of the grounding connector for connecting to a grounding wire of a structure.

3. The method of claim 1, wherein, in the planar configuration, the grounding plate forms a rectangle.

4. The method of claim 3, wherein, in the planar configuration, the grounding connector extends along a long edge of the rectangle.

5. A method of electrically grounding a structure, comprising:
providing a grounding plate that is made from an electrically conductive material, the grounding plate comprising:
a plate body, the plate body having a first face and a second face opposite and parallel to the first face, the first and second faces being planar;
a grounding connector formed from the same material as the plate body, having a first end and a second end, the first end being connected to the plate body;
bending the grounding connector relative to the plate body about the first end of the grounding connector from a planar configuration to a functional configuration, wherein, in the planar configuration, the grounding connector is aligned with and parallel to the first and second faces of the plate body, and in the functional configuration, the grounding connector is at an angle relative to the first face of the plate body;
installing the grounding plate in a ground surface such that the plate body is embedded below the ground surface and the second end of the grounding connector extends above the ground surface.

6. The method of claim 5, wherein installing the grounding plate in the ground surface comprises pouring a layer of concrete above the plate body and below the second end of the grounding connector.

7. The method of claim 5, wherein, in the planar configuration, the grounding plate forms a rectangle.

8. The method of claim 5, wherein the grounding connector has a wire connection point toward the second end of the grounding connector for connecting to a grounding wire of a structure and wherein installing the grounding plate comprises connecting a wire between the structure and the wire connection.

9. The method of claim 5, wherein providing the grounding plate comprises cutting the grounding plate from a peripheral edge to an intermediate point within the peripheral edge to form the plate body and the grounding connector.

10. The method of claim 5, further comprising the step of removing the grounding plate from a stack of a plurality of grounding plates in the planar configuration.

11. The method of claim 10, wherein, in the planar configuration, the grounding connector extends along a long edge of the rectangle.

12. A stack of grounding plates, comprising: a plurality of grounding plates in a stacked relationship, each grounding plate comprising: a plate body, the plate body having a first face and a second face opposite and parallel to the first face, the first and second faces being planar; a grounding connector formed from the same material as the plate body, having a first end and a second end, the first end being connected to the plate body; wherein the grounding connector is bendable relative to the plate body about the first end of the grounding connector from a planar configuration to a functional configuration, wherein, in the planar configuration, the grounding connector is aligned with and parallel to the first and second faces of the plate body, and in the functional configuration, the grounding connector is at an angle relative to the first face of the plate body; wherein the grounding plate is formed by cutting the grounding plate from a peripheral edge to an intermediate point within the peripheral edge to form the plate body and the grounding connector.

13. The method of claim 12, wherein the grounding connector has a wire connection point toward the second end of the grounding connector for connecting to a grounding wire of a structure.

14. The stack of claim 12, wherein, in the planar configuration, each grounding plate forms a rectangle.

15. The stack of claim 14, wherein, in the planar configuration, the grounding connector extends along a long edge of the rectangle.

* * * * *